(12) United States Patent
Yu et al.

(10) Patent No.: US 7,765,720 B2
(45) Date of Patent: Aug. 3, 2010

(54) OUTSOLE FOR AN ARTICLE OF FOOTWEAR

(75) Inventors: Sui-Chieh Yu, Portland, OR (US); Denis Schiller, Vancouver, WA (US); Michael Bergmann, Portland, OR (US)

(73) Assignee: Nike, Inc., Beaverton, OR (US)

( * ) Notice: Subject to any disclaimer, the term of this patent is extended or adjusted under 35 U.S.C. 154(b) by 831 days.

(21) Appl. No.: 11/652,646

(22) Filed: Jan. 12, 2007

(65) Prior Publication Data

US 2008/0171809 A1 Jul. 17, 2008

(51) Int. Cl.
*A43B 13/04* (2006.01)
*A43B 13/00* (2006.01)

(52) U.S. Cl. ........................ 36/25 R; 36/32 R
(58) Field of Classification Search .............. 36/25 R, 36/4, 7.3, 32 R; 12/142 R, 146
See application file for complete search history.

(56) References Cited

U.S. PATENT DOCUMENTS

| | | | |
|---|---|---|---|
| 2,657,190 | A | 10/1953 | Banes et al |
| 3,938,574 | A | 2/1976 | Burmester et al. |
| 4,289,861 | A | 9/1981 | Onizawa |
| 4,468,496 | A | 8/1984 | Takeuchi et al. |
| 5,221,714 | A | 6/1993 | Parker |
| 5,264,290 | A | 11/1993 | Touchet et al. |
| 5,395,891 | A | 3/1995 | Obrecht et al. |
| 5,554,694 | A | 9/1996 | Crow |
| 5,695,850 | A | 12/1997 | Crow |
| 5,906,872 | A | 5/1999 | Lyden et al. |
| 6,041,520 | A | 3/2000 | Aoki |
| 6,120,880 | A | 9/2000 | Crow |
| 6,180,703 | B1 | 1/2001 | Onoi et al. |
| 6,184,296 | B1 | 2/2001 | Obrecht et al. |
| 6,486,258 | B1 | 11/2002 | Noguchi et al. |
| 6,498,223 | B2 | 12/2002 | Sakata et al. |
| 6,589,630 | B1 | 7/2003 | Crow |
| 6,828,385 | B2 | 12/2004 | Gamlin et al. |
| 2003/0171500 | A1 | 9/2003 | Guo et al. |
| 2005/0131127 | A1 | 6/2005 | Wilson, III |
| 2006/0110559 | A1 | 5/2006 | Nasreddine et al. |

FOREIGN PATENT DOCUMENTS

| | | |
|---|---|---|
| EP | 1241027 | 9/2002 |
| JP | 2005118243 | 4/2008 |

OTHER PUBLICATIONS

International Search Report, PCT/US2007/086711, dated Apr. 9, 2008.

*Primary Examiner*—Marie Patterson
(74) *Attorney, Agent, or Firm*—Banner & Witcoff, Ltd.

(57) ABSTRACT

An article of footwear includes an upper and a sole assembly secured to the upper. The sole assembly includes a lower ground engaging surface portion and an upper surface portion. The upper surface of the first portion is in contact with the upper. At least part of the lower ground engaging surface portion is a polymer material formed from a blend of polybutadiene polymer and a carboxylated butadiene-acrylonitrile or partially hydrogenated carboxylated butadiene acrylonitrile; wherein the polymer material has a density of 1.00-1.25 g/cm$^3$ and a hardness of at least 55 Asker C.

61 Claims, 3 Drawing Sheets

OUTSOLE FOR AN ARTICLE OF FOOTWEAR

FIELD

Aspects of the present invention relate to outsoles for athletic footwear.

BACKGROUND

A conventional article of athletic footwear includes two primary elements, an upper and a sole structure. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower portion of the upper and is generally positioned between the foot and the ground. In addition to attenuating ground reaction forces (i.e., imparting cushioning), the sole structure may provide traction and control foot motions, such as pronation. Accordingly, the upper and the sole structure operate cooperatively to provide a comfortable structure that is suited for a variety of ambulatory activities, such as walking and running, and sports such as tennis, basketball, and skating.

The sole structure of athletic footwear generally exhibits a layered configuration that may include a comfort-enhancing insole, a resilient midsole formed from a polymer foam material, and a ground-contacting outsole that provides both abrasion-resistance and traction.

It is desirable to have outsoles that offer high energy return to the athlete. For example, 1,4-polybutadiene is a known polymer for incorporating into outsoles of athletic and other footwear. However, when combined with other polymers/rubbers, the high energy return is often diminished. Moreover, the bottom contact surface of the polymer can wear out quickly on high impact footwear such as for tennis and basketball footwear. Tennis is often played on an abrasive surface, which increases the wear on the shoe, in particular certain regions of the shoe.

It would be desirable to provide a footwear outsole system that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide an article of footwear having a durable outsole. This durable outsole assembly provides footwear that is significantly more durable than other footwear, providing advantages to athletes in tennis and basketball, for example.

These and additional features and advantages disclosed here will be further understood from the following detailed disclosure of certain embodiments.

Figure 1:
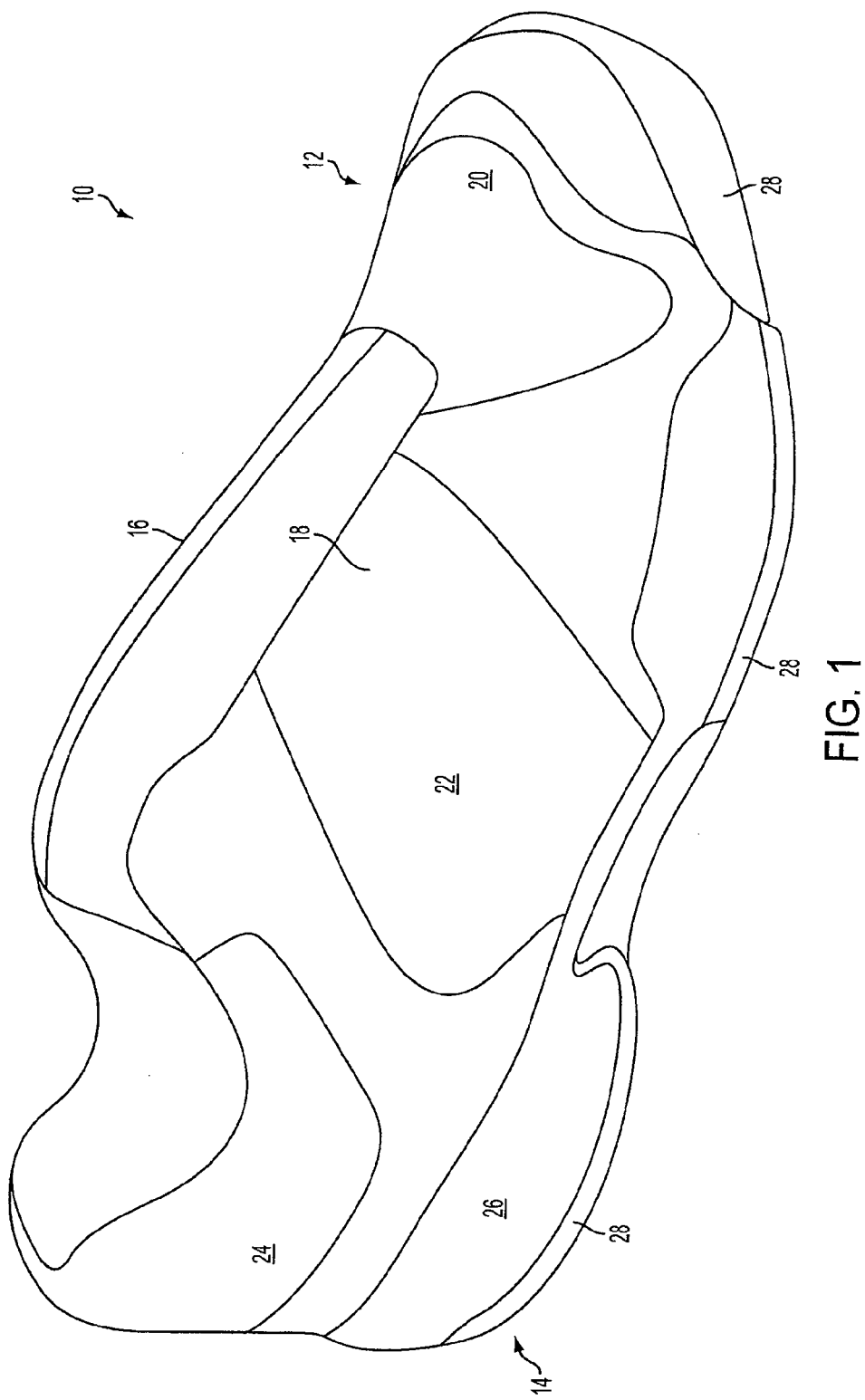
FIG. 1 is an elevation view of an article of footwear with a sole assembly having an outsole.

The figures referred to above are not drawn necessarily to scale and should be understood to provide a representation of the invention, illustrative of the principles involved. Some features of the article of footwear depicted in the drawings have been enlarged or distorted relative to others to facilitate explanation and understanding. The same reference numbers are used in the drawings for similar or identical components and features shown in various alternative embodiments. Articles of footwear as disclosed herein would have configurations and components determined, in part, by the intended application and environment in which they are used.

DETAILED DESCRIPTION (Footwear Description)

Aspects of the invention utilize an outsole that is significantly more durable than other outsole compositions.

The present invention may be embodied in various forms.

The footwear may be any suitable footwear such as tennis shoes or basketball shoes where high energy return properties are desired. Tennis shoes, for example, can be made that have high energy return but lower wearability of other conventional running shoes.

One embodiment of an article of footwear 10 is shown in FIG. 1. Footwear 10 includes an upper 12 and a sole assembly 14 secured to upper 12. Sole assembly 14 may be secured to upper 12 by adhesive or any other suitable means. Footwear 10 has a medial, or inner, side 16 and a lateral, or outer, side 18.

Sole assembly 14, which is generally disposed between the foot of the wearer and the ground, provides attenuation of ground reaction forces (i.e., imparting cushioning), traction, and may control foot motions, such as pronation. As with conventional articles of footwear, sole assembly 14 may include an insole (not shown) located within upper 12. Sole assembly typically has an outsole 28 and a midsole 26.

For purposes of general reference, footwear 10 may be divided into three general portions: a forefoot portion 20, a midfoot portion 22, and a heel portion 24. Portions 20, 22, and 24 are not intended to demarcate precise areas of footwear 10. Rather, portions 20, 22, and 24 are intended to represent general areas of footwear 10 that provide a frame of reference during the following discussion.

Unless otherwise stated, or otherwise clear from the context below, directional terms used herein, such as rearwardly, forwardly, top, bottom, inwardly, downwardly, upwardly, etc., refer to directions relative to footwear 10 itself. Footwear is shown in FIG. 1 to be disposed substantially horizontally, as it would be positioned on a horizontal surface when worn by a wearer. However, it is to be appreciated that footwear 10 need not be limited to such an orientation. Thus, in the illustrated embodiment of FIG. 1, rearwardly is toward heel portion 24, that is, to the left as seen in FIG. 1. Naturally, forwardly is toward forefoot portion 20, that is, to the right as seen in FIG. 1, and downwardly is toward the bottom of the page as seen in FIG. 1. Top refers to elements toward the top of the page as seen in FIG. 1, while bottom refers to elements toward the bottom of the page as seen in FIG. 1. Inwardly is toward the center of footwear 10, and outwardly is toward the outer peripheral edge of footwear 10.

Figure 2:
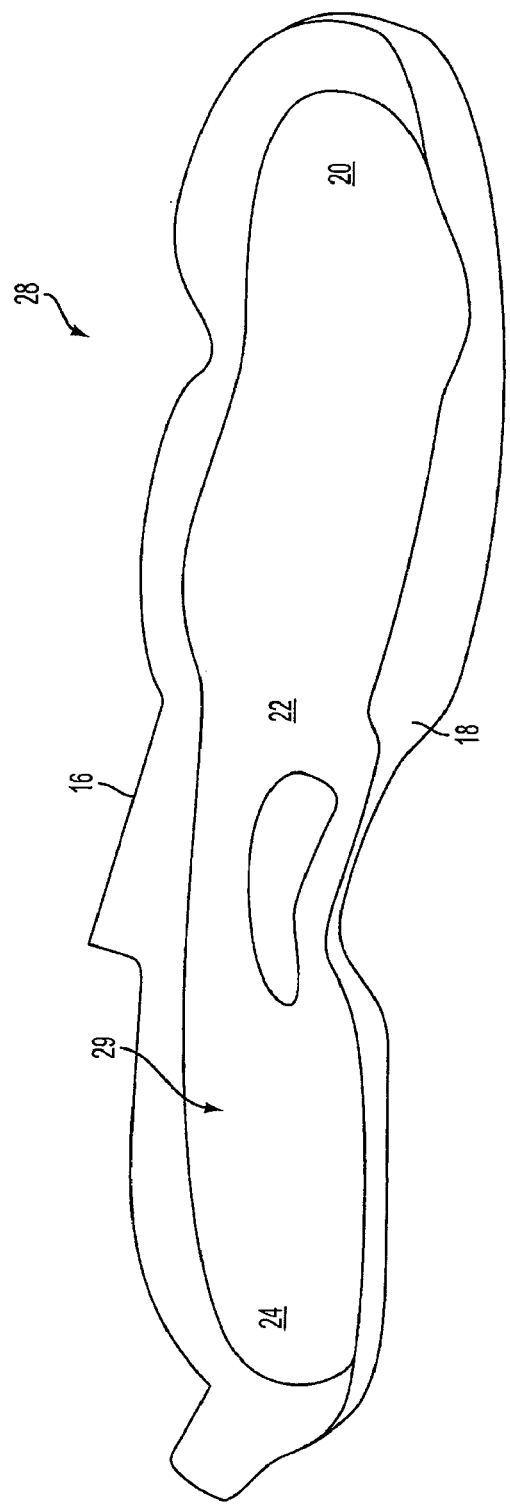
FIG. 2 is a view of the top side of the outsole of the article of footwear of FIG. 1.

As can be seen in FIG. 2, outsole 28 is the bottom part of the footwear that makes contact with the ground. Upper surface 29 is secured to midsole 26 with adhesive or other suitable fastening means.

Figure 3:
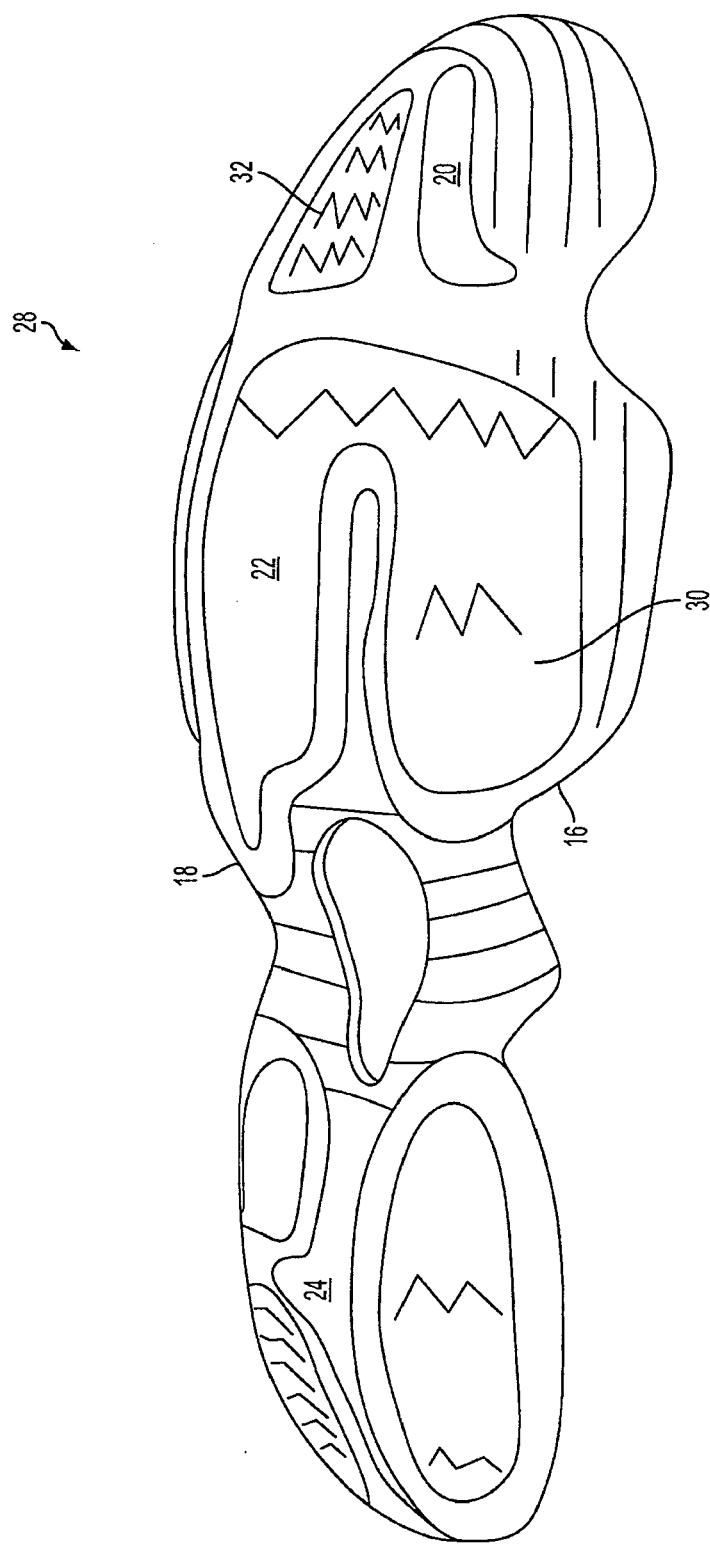
FIG. 3 is a view of the bottom side of the outsole of FIG. 1.

As seen best in FIG. 3, a ground engaging lower surface 30 can include, for example, a plurality of grooves 32. The ground engaging lower surface can also contain projections (not shown).

(Introduction to Outsole Material)

The outsole material is made of a blend of polybutadiene polymer and a carboxylated butadiene-acrylonitrile or partially hydrogenated carboxylated butadiene acrylonitrile. It was found that the carboxylated butadiene-acrylonitrile adds to the wearability of the shoe product without diminishing the high energy return of the polybutadiene.

Any suitable polybutadiene may be used such as 1,4-polybutadiene or 1,2,-polybutadiene although 1,4-polybutadiene generally offers higher energy return. The 1,4-polybutadiene has a high cis content, generally at least 90%, more typically at least 95%, or at least 98%. The blend contains polybutadiene in amounts generally from 60 to 95 parts, for example, 65-85 parts.

The blend further contains carboxylated butadiene-acrylonitrile and/or partially hydrogenated carboxylated butadiene acrylonitrile in amounts generally from 5 to 40 parts, for example, 15-35 parts.

The carboxylated butadiene-acrylonitrile is prepared by copolymerizing butadiene and acrylonitrile monomers and modifying the copolymer to include carboxylic groups in the copolymer chain. The polymerization of these monomers produces a chain similar to a normal butadiene-acrylonitrile rubber except for the carboxyl groups which are distributed along the chain with a frequency of about 1 to every 100 to 200 carbon atoms.

Hydrogenated carboxylated butadiene-acrylonitrile may be partially or completely hydrogenated and can be produced by the selective and controlled hydrogenation of butadieneacrylonitrile rubber (NBR). The % acrylonitrile may range from 30 to 40% of the carboxylated butadiene-acrylonitrile. Residual double bonds may range from up to 5.5%, typically about 3-4%.

The outsole material used in embodiments described herein generally has a density of about 1.00 to 1.25 g/cm$^3$, typically about 1.10 to 1.15 g/cm$^3$.

(Additives)

A coupling agent may be added to the polymer blend. Suitable coupling agents include organosilanes such as 3-thiocyanatopropyltriethoxysilane (($C_2H_5O)_3Si(CH_2)_3$— SCN; Bis(triethoxysilylpropyl)disulfide; Bis(triethoxysilylpropyl)polysulfide; and 3-(Triethoxysilyl) propanthiol, and reaction products with ethoxylated C13-alcohol Other additives may be added to achieve the desired qualities of the polymer blend. These additives are added in an amount to achieve the desired result. Additives include other rubbers, pigments fillers, catalysts, stabilizers, curing agents, pressing agents, softening agents, lubricants, metal fibers, graphite, colorants, accelerators, activators, adhesion promoters, and the like. These additives may be present in conventional amounts.

For example, a pigment may be added in an amount to obtain the desired whiteness or color of the outsole material. Suitable pigments can be used such as, but not limited to, black pigment. Fillers may be added to the blend used such as, but not limited to, fumed or precipitated silica and carbon black.

Suitable processing agents may be added to provide a desired processing effect. Suitable processing agents include, for example, fatty acid esters. Other additives improve processing characteristics and behave as plasticizers such as napthenic oil.

Suitable activators may be added such as, but not limited to zinc oxide, stearic acid, and urea. Stearic acid may also be added as an internal lubricant.

Paraffin wax or other additives for rubber protection may be used

Suitable cure system agents can be used, typically in the range of about 0.5 to about 6 phr, typically about 2 to about 3. Suitable cure systems include tetra thiuram disulphide, insoluble sulfur, and 2,2'dibenzothiazyl disulphide.

The polymer can be formed in a suitable manner. For example, the materials can be mixed together using any suitable internal mixer such as a Banbury mixer.

Generally, the polymer ingredients are added to the mixer and mixed for approximately 1 minute at about 80 C. About ½ of the silica is added and mixed for 2-3 minutes. Add the rest of the silica and the oil and other ingredients such as ZnO and continue to mix. During this process, the temperature is raised to about 115 C.

After mixing, the mixture is dumped into a roll mill and homogenized for 4-5 minutes at about 50 C. The sheet rubber is cooled at room temperature for at least 6 hours, or overnight.

Accelerators and sulfur are then added on the mill to the polymer sheet. The combination is cross-blended 10 to 15 times and tight milled 6 times at 1 mm nip. The polymer is sheet out and cooled before pressing. The rubber is calendared and cut into sheets.

The roll mill may be a typical 2 roll mill and provides a sheet stock in accordance with conventional techniques. The sheet stock is further processed using traditional compression molding methods for footwear manufacturing. The outsole is a typically a compression molded product.

The cure temperature of the foam is typically 150° C. to 170° C. Cure times and mold thickness are variable depending on the desired thickness of the polymer material.

The hardness (Shore A) is typically from about 60 to 80, typically 60 to 75, or 68 to 72 and can vary depending on whether the hydrogenated or non-hydrogenated polymer is prepared. The properties depend on the desired properties of footwear, for example.

Tensile strength can be from 100 to 160 kg/cm$^2$, typically about 130 to about 150 kg/cm$^2$. The elongation, may be from about 300 to about 600%, typically from about 350 to about 500%. Tear strength can be from about 50 to about 80 kg.

The outsole material may be used on any suitable athletic or other footwear that requires a durable outsole. Examples include, but are not limited to, tennis shoes, basketball shoes, track shoes, skateboarding shoes, and the like.

The outsole material may be comprises the entire outsole or may form part of an outsole integrally made of several different types of material. For example, the outsole material may form used in the forefoot area of the outsole.

The outsole material may also be used as part of the upper such as the toe region of the upper to prevent this region from wearing out.

In shoe tests, the Akron cc/loss should be less than 0.12 and typically between 0.05 and 0.08. It is desirable to have lower values. DIN abrasion is typically less than 50 mg, desirably less than 30 mg or less than 25 mg. NBS Abrasion is typically greater than 1100, more typically greater 1500, more desirably greater than 2500.

EXAMPLE 1

The following material was prepared using carboxylated butadiene-acrylonitrile.

| Polymer Material | PHR (Parts per hundred) |
|---|---|
| Polymers | |
| BR0150 Ubepol (Polybutadiene Polymer) | 80 |
| KRYNAC X146 (1%, 32 mney) (Carboxylated butadiene-acrylonitrile) | 20 |
| Additives | |
| Precipitated Silica (Filler) | 42 |
| ZnO (Activator) | 3.5 |
| WB212 Fatty acid ester (Process Aid) | 1 |
| Si-264 Organosilane (Coupling agent) | 4 |
| ST-AC (Stearic Acid) (Lubricant/Activator) | 1 |
| Naphthenic Oil (Process Aid/Plasticizer) | 4 |
| Urea (Activator) | 1.5 |
| Paraffin Wax (Rubber protection) | 0.5 |
| Black Pigment (Pigment) | 3 |
| 60NS (Homogenizing Agent) | 1 |
| Cure System and Blowing Agents | |
| Dispersion of tetrbenyl thiuram disulphide | 0.5 |
| Dispersion of insoluble sulphur | 2.5 |
| Dispersion of 2,2'dibenzothiazyl disulphide | 1.2 |
| Cure temperature | 150° C. |
| Cure time | T90 + 1 min |
| Physical Properties | A |
| Durometer Asker C | 64-65 |
| Modulus 300% | 72; 69; 72; 71 |
| Tensile kg./cm$^2$ | 103; 110; 126; 115 |
| Elongation % | 422; 461; 509; 472 |
| Tear kg. | 71; 76; 59; 59 |
| S.G. g/cc | 1.1; 1.1 |
| Abrasion Data | |
| Akron cc/loss | .11; .09 |
| DIN Abrasion | 26; 27 |
| NBS Abrasion | 1349; 1400 |

EXAMPLE 2

The following polymer material was prepared using partially hydrogenated carboxylated butadiene-acrylonitrile.

| Polymer Material | PHR (Parts per hundred) |
|---|---|
| Polymers | |
| BR0150 Ubepol (Polybutadiene Polymer) | 70 |
| Therban XTVPKA 8889 (Partially hydrogenated carboxylated butadiene-acrylonitrile) | 30 |
| Additives | |
| Precipitated Silica (Filler) | 42 |
| ZnO (Activator) | 3.5 |
| WB212 Fatty acid ester (Process Aid) | 1 |
| Si-264 Organosilane (Coupling agent) | 4 |
| ST-AC (Stearic Acid) (Lubricant/Activator) | 1 |
| Naphthenic Oil (Process Aid/Plasticizer) | 4 |
| Urea (Activator) | 1.5 |
| Paraffin Wax (Rubber protection) | 0.5 |
| Black Pigment (Pigment) | 3 |
| 60NS (Homogenizing Agent) | 1 |
| Cure System and Blowing Agents | |
| Dispersion of tetrbenyl thiuram disulphide | 0.5 |
| Dispersion of insoluble sulphur | 2.5 |
| Dispersion of 2,2'dibenzothiazyl disulphide | 1.2 |
| Cure temperature | 150° C. |

-continued

| Cure time | T90 + 1 min |
|---|---|
| Physical Properties | A |
| Durometer Asker C | 74-75 |
| Modulus 300% | 109; 110; 107; 105 |
| Tensile kg./cm$^2$ | 153; 130; 154; 136 |
| Elongation % | 459; 372; 470; 417 |
| Tear kg. | 74; 53; 63; 73 |
| S.G. g/cc | 1.1; 1.1 |
| Abrasion Data | |
| Akron cc/loss | .08; .08 |
| DIN Abrasion | 43; 43 |
| NBS Abrasion | 2552; 2410 |

In light of the foregoing disclosure of the invention and description of various embodiments, those skilled in this area of technology will readily understand that various modifications and adaptations can be made without departing from the scope and spirit of the invention. All such modifications and adaptations are intended to be covered by the following claims.

What is claimed is:

1. An article of footwear comprising, in combination:
   an upper;
   a sole assembly secured to the upper and comprising:
      a lower ground engaging surface portion and an upper surface portion in contact with the upper,
      wherein at least part of the lower ground engaging surface portion comprises a polymer material formed from a blend of polybutadiene polymer and a carboxylated butadiene-acrylonitrile or partially hydrogenated carboxylated butadiene acrylonitrile;
      wherein the polymer material has a density of 1.00-1.25 g/cm$^3$ and a hardness of at least 55 Asker C.

2. The article of footwear of claim 1 wherein the polymer material comprises about 60 to about 95 parts polybutadiene polymer and about 5 to about 40 parts carboxylated butadiene-acrylonitrile or partially hydrogenated carboxylated butadiene acrylonitrile.

3. The article of footwear of claim 1 wherein the polymer material comprises about 65 to about 85 parts polybutadiene polymer and about 15 to about 35 parts carboxylated butadiene-acrylonitrile or partially hydrogenated carboxylated butadiene acrylonitrile.

4. The article of footwear of claim 1 wherein the polybutadiene polymer is 1,4-polybutadiene.

5. The article of footwear of claim 1 wherein the 1,4-polybutadiene has a cis content of at least 90%.

6. The article of footwear of claim 1 wherein the polymer material further comprises a silane coupling agent.

7. The article of footwear of claim 1 wherein the silane coupling agent is 3-thiocyanatopropyltriethoxysilane.

8. The article of footwear of claim 1 wherein the polymer material has a density of about 1.10-1.15 g/cm$^3$.

9. The article of footwear of claim 1 wherein the lower ground engaging surface portion comprises a heel portion, a midfoot portion and a forefoot portion wherein at least the forefoot portion comprises the polymer material.

10. The article of footwear of claim 1 wherein the a lower ground engaging surface portion comprises a medial side portion and a lateral side portion wherein at least part of the medial side portion comprises the polymer material.

11. The article of footwear of claim 1 wherein the polymer material is compression molded to form the at least part of the lower ground engaging surface portion.

12. The article of footwear of claim 1 wherein the upper comprises the polymer material in the toe region of the upper.

13. The article of footwear of claim 1 wherein the lower ground engaging surface includes a plurality of grooves.

14. The article of claim 1 wherein the Akron cc/loss is less than 0.12.

15. The article of claim 1 wherein the DIN abrasion is less than 30 mg and NBS abrasion is greater 1500.

16. The article of footwear of claim 1 wherein the hardness is 60 to 80 Asker C.

17. The article of footwear of claim 1 wherein the polymer material comprises a carboxylated butadiene-acrylonitrile and the hardness of the polymer material is 60 to 70 Asker C.

18. The article of footwear of claim 1 wherein the polymer material comprises a partially hydrogenated carboxylated butadiene acrylonitrile and the hardness of the polymer material is 70 to 80 Asker C.

19. The article of footwear of claim 1 wherein the footwear is a tennis shoe.

20. The article of footwear of claim 1 wherein the footwear is a basketball shoe.

21. An article of footwear comprising, in combination:
an upper;
a sole assembly secured to the upper and comprising:
a lower ground engaging surface and an upper surface secured to the upper, the lower ground engaging surface comprising a polymer material formed from a blend of 1,4-polybutadiene polymer and a carboxylated butadiene-acrylonitrile or partially hydrogenated carboxylated butadiene acrylonitrile;
wherein the polymer material has a density 1.10-1.15 g/cm$^3$ and a hardness of about 60 to about 80 Asker C.

22. A sole assembly comprising:
a lower ground engaging surface portion and an upper surface portion,
wherein at least part of the lower ground engaging surface portion comprises a polymer material formed from a blend of polybutadiene polymer and a carboxylated butadiene-acrylonitrile or partially hydrogenated carboxylated butadiene acrylonitrile;
wherein the polymer material has a density of 1.00-1.25 g/cm$^3$ and a hardness of at least 55 Asker C.

23. The sole assembly of claim 22 wherein the polymer material comprises about 60 to about 95 parts polybutadiene polymer and about 5 to about 40 parts carboxylated butadiene-acrylonitrile or partially hydrogenated carboxylated butadiene acrylonitrile.

24. The sole assembly of claim 22 wherein the polymer material comprises about 65 to about 85 parts polybutadiene polymer and about 15 to about 35 parts carboxylated butadiene-acrylonitrile or partially hydrogenated carboxylated butadiene acrylonitrile.

25. The sole assembly of claim 22 wherein the polybutadiene polymer is 1,4-polybutadiene.

26. The sole assembly of claim 25 wherein the 1,4-polybutadiene has a cis content of at least 90%.

27. The sole assembly of claim 22 wherein the polymer material further comprises a silane coupling agent.

28. The sole assembly of claim 22 wherein the silane coupling agent is 3-thiocyanatopropyltriethoxysilane.

29. The sole assembly of claim 22 wherein the polymer material has a density of about 1.10-1.15 g/cm$^3$.

30. The sole assembly of claim 22 wherein the lower ground engaging surface portion comprises a heel portion, a midfoot portion and a forefoot portion wherein at least the forefoot portion comprises the polymer material.

31. The sole assembly of claim 22 wherein the lower ground engaging surface portion comprises a medial side portion and a lateral side portion wherein at least part of the medial side portion comprises the polymer material.

32. The sole assembly of claim 22 wherein the polymer material is compression molded to form the at least part of the lower ground engaging surface portion.

33. The sole assembly of claim 22 wherein the lower ground engaging surface includes a plurality of grooves.

34. The sole assembly of claim 22 wherein the Akron cc/loss is less than 0.12.

35. The sole assembly of claim 22 wherein the DIN abrasion is less than 30 mg and NBS abrasion is greater 1500.

36. The sole assembly of claim 22 wherein the hardness is 60 to 80 Asker C.

37. The sole assembly of claim 22 wherein the polymer material comprises a carboxylated butadiene-acrylonitrile and the hardness of the polymer material is 60 to 70 Asker C.

38. The sole assembly of claim 22 wherein the polymer material comprises a partially hydrogenated carboxylated butadiene acrylonitrile and the hardness of the polymer material is 70 to 80 Asker C.

39. A tennis shoe comprising, in combination:
an upper;
a sole assembly secured to the upper and comprising:
a lower ground engaging surface portion and an upper surface portion in contact with the upper,
wherein at least part of the lower ground engaging surface portion comprises a polymer material formed from a blend of polybutadiene polymer and a carboxylated butadiene-acrylonitrile or partially hydrogenated carboxylated butadiene acrylonitrile;
wherein the polymer material has a density 1.10-1.15 g/cm$^3$ and a hardness of about 60 to about 80 Asker C.

40. The tennis shoe of claim 39 wherein the polymer material comprises about 60 to about 95 parts polybutadiene polymer and about 5 to about 40 parts carboxylated butadiene-acrylonitrile or partially hydrogenated carboxylated butadiene acrylonitrile.

41. The tennis shoe of claim 39 wherein the polymer material comprises about 65 to about 85 parts polybutadiene polymer and about 15 to about 35 parts carboxylated butadiene-acrylonitrile or partially hydrogenated carboxylated butadiene acrylonitrile.

42. The tennis shoe of claim 39 wherein the polybutadiene polymer is 1,4-polybutadiene.

43. The tennis shoe of claim 39 wherein the 1,4-polybutadiene has a cis content of at least 90%.

44. The tennis shoe of claim 39 wherein the polymer material further comprises a silane coupling agent.

45. The tennis shoe of claim 39 wherein the silane coupling agent is 3-thiocyanatopropyltriethoxysilane.

46. The tennis shoe of claim 39 wherein the Akron cc/loss is less than 0.12.

47. The tennis shoe of claim 39 wherein the DIN abrasion is less than 30 mg and NBS abrasion is greater 1500.

48. The tennis shoe of claim 39 wherein the polymer material comprises a partially hydrogenated carboxylated butadiene acrylonitrile.

49. A tennis shoe sole assembly comprising:
a lower ground engaging surface portion and an upper surface portion,
wherein at least part of the lower ground engaging surface portion comprises a polymer material formed from a blend of polybutadiene polymer and a carboxylated butadiene-acrylonitrile or partially hydrogenated carboxylated butadiene acrylonitrile;

wherein the polymer material has a density 1.10-1.15 g/cm$^3$ and a hardness of about 60 to about 80 Asker C.

50. The tennis shoe sole assembly of claim 49 wherein the polymer material comprises about 60 to about 95 parts polybutadiene polymer and about 5 to about 40 parts carboxylated butadiene-acrylonitrile or partially hydrogenated carboxylated butadiene acrylonitrile.

51. The tennis shoe sole assembly of claim 49 wherein the polymer material comprises about 65 to about 85 parts polybutadiene polymer and about 15 to about 35 parts carboxylated butadiene-acrylonitrile or partially hydrogenated carboxylated butadiene acrylonitrile.

52. The tennis shoe sole assembly of claim 49 wherein the polybutadiene polymer is 1,4-polybutadiene.

53. The tennis shoe sole assembly of claim 49 wherein the 1,4-polybutadiene has a cis content of at least 90%.

54. The tennis shoe sole assembly of claim 49 wherein the polymer material further comprises a silane coupling agent.

55. The tennis shoe sole assembly of claim 49 wherein the silane coupling agent is 3-thiocyanatopropyltriethoxysilane.

56. The tennis shoe sole assembly of claim 49 wherein the Akron cc/loss is less than 0.12.

57. The tennis shoe sole assembly of claim 49 wherein the DIN abrasion is less than 30 mg and NBS abrasion is greater 1500.

58. The tennis shoe sole assembly of claim 49 wherein the polymer material comprises a partially hydrogenated carboxylated butadiene acrylonitrile.

59. A process of preparing footwear comprising
securing a sole assembly to an upper;
the sole assembly comprising:
a lower ground engaging surface portion and an upper surface potion, the upper surface portion in contact with the upper;
wherein at least part of the lower ground engaging surface portion comprises a polymer material formed from a blend of polybutadiene polymer and a carboxylated butadiene-acrylonitrile or partially hydrogenated carboxylated butadiene acrylonitrile;
wherein the polymer material has a density of 1.00-1.25 g/cm$^3$ and a hardness of at least 55 Asker C.

60. The process of claim 59 further comprising securing the upper surface portion to the upper.

61. The process of claim 59 wherein the at least part of the lower ground engaging surface portion comprising the polymer material is compression molded.

\* \* \* \* \*